No. 773,460. PATENTED DEC. 27, 1904.
J. W. NESMITH.
SPRING FOR AUTOMOBILES OR THE LIKE.
APPLICATION FILED SEPT. 19, 1904.

3 SHEETS—SHEET 1.

WITNESSES:
Arthur Middleton
Edward Sarton

INVENTOR.
JOHN W. NESMITH
BY
Spear Middleton Donaldson & Spear
ATTORNEYS

No. 778,460. PATENTED DEC. 27, 1904.
J. W. NESMITH.
SPRING FOR AUTOMOBILES OR THE LIKE.
APPLICATION FILED SEPT. 19, 1904.

3 SHEETS—SHEET 2.

WITNESSES:
Arthur Middleton
Edward Saxton

INVENTOR.
J. W. NESMITH
BY
Spear, Middleton, Donaldson & Spear
ATTORNEYS

No. 778,460. PATENTED DEC. 27, 1904.
J. W. NESMITH.
SPRING FOR AUTOMOBILES OR THE LIKE.
APPLICATION FILED SEPT. 19, 1904.

3 SHEETS—SHEET 3.

WITNESSES:
Arthur Middleton
Edward Sartow

INVENTOR.
J. W. NESMITH
BY
Spear, Middleton, Donaldson & Spear
ATTORNEYS.

No. 778,460.

Patented December 27, 1904.

UNITED STATES PATENT OFFICE.

JOHN W. NESMITH, OF DENVER, COLORADO.

SPRING FOR AUTOMOBILES OR THE LIKE.

SPECIFICATION forming part of Letters Patent No. 778,460, dated December 27, 1904.

Application filed September 19, 1904. Serial No. 225,017.

*To all whom it may concern:*

Be it known that I, JOHN W. NESMITH, a citizen of the United States, residing at Denver, Colorado, have invented certain new and useful Improvements in Springs for Automobiles or the Like, of which the following is a specification.

Ordinary elliptic carriage-springs as applied to high-speed vehicles, as automobiles, are totally inadequate in elasticity or resilience to take up the shock incident. To increase resilience, rubber tires are used, and to reduce first cost and subsequent cost for repairs on such tires small wheels are used, but with results which are far from satisfactory.

The present invention relates to a system of springs which affords sufficient elasticity to admit of the use of iron or steel tires on the wheels, on which rubber treads may be used, if desired, to deaden the noise, these costing less than ten per cent. as much as the rubber tire in common use, while they sustain little or no damage and cause no delay from punctures. Larger wheels can then be used without excessive cost.

The invention is illustrated in the accompanying drawings, in which—

Figure 1:
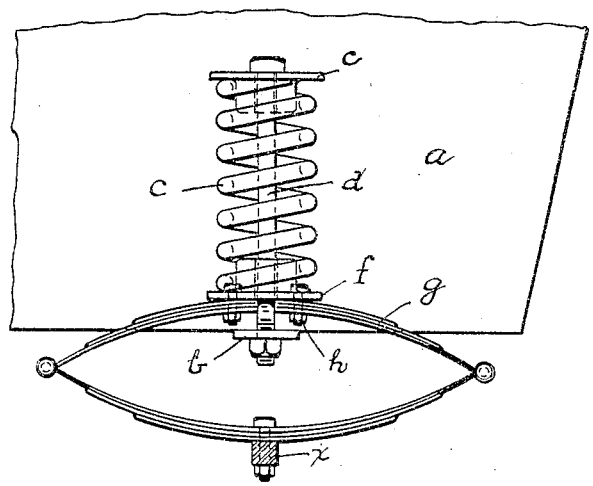
Figure 2:
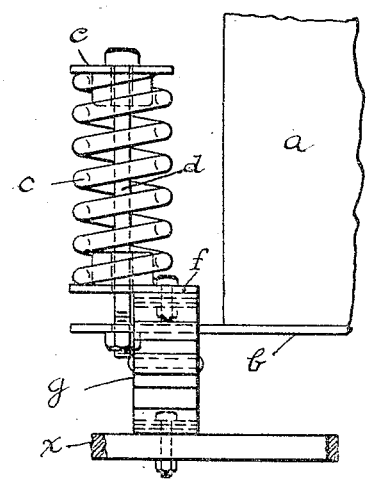
Figure 3:
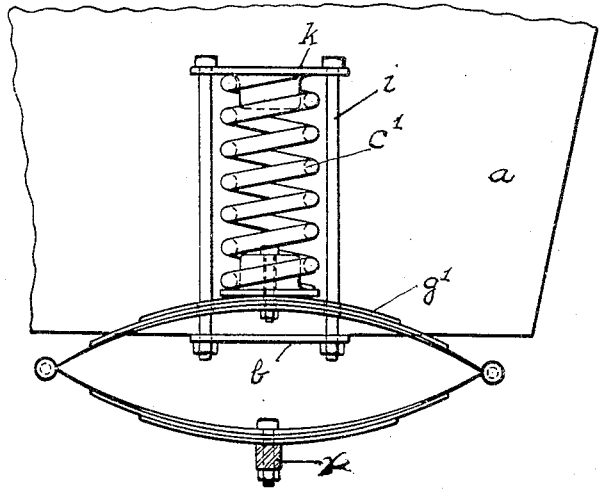
Figure 4:
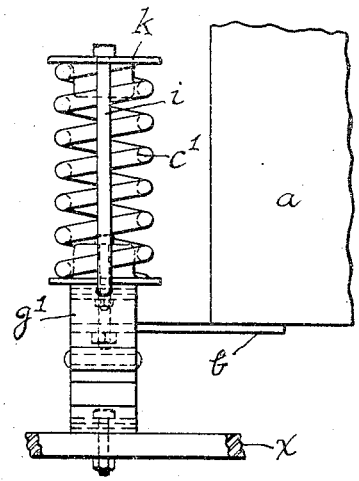
Figure 5:
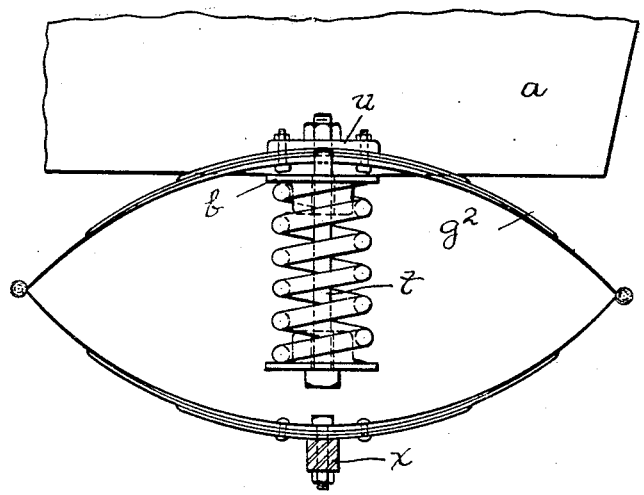
Figure 6:
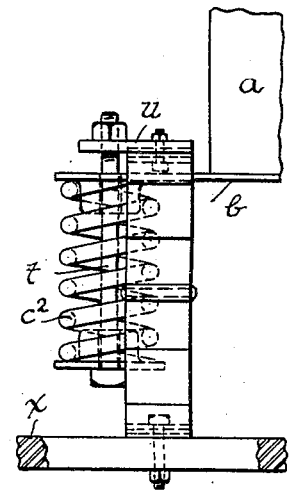
Figure 7:
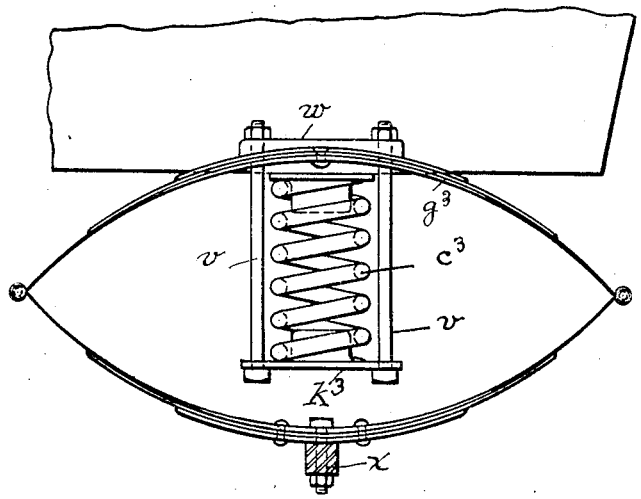
Figure 8:
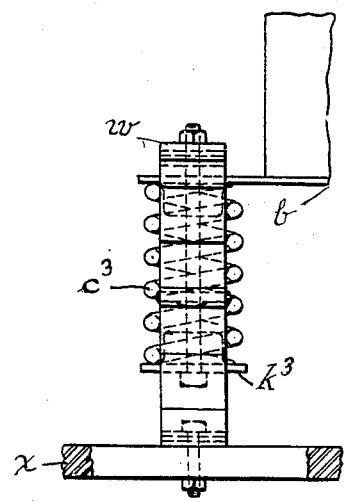

Figures 1 and 2 show two vertical elevations at right angles to each other of a compound spring consisting of a spiral spring resting upon an elliptic spring. Figs. 3 and 4 are similar views of a slight modification. Figs. 5 and 6 are like views of a modification in which the spiral spring is located within the lines of the elliptical spring. Figs. 7 and 8 show a slight modification of the form shown in Figs. 5 and 6. Figs. 9 and 10 and 11 and 12 show, respectively, similar views of two further modifications.

Referring by reference-letters to the drawings and first to Figs. 1 and 2, the carriage-body is shown at $a$, carried by supporting brackets or lugs $b$, properly secured to the carriage-body. These lugs or brackets are supported and carried by the spiral springs $c$ through the bolts $d$ passing through caps or plates $e$ on the tops of the spiral springs $c$, thence, down through the spirals, and through the supporting-brackets $b$, with nuts below. Thus the weight of the carriage-body $a$ is carried by the spiral springs $c$. The spiral springs $c$ rest upon supporting-plates $f$, which are firmly bolted to the elliptic springs $g$ by the bolts $h$. Thus the spiral springs, with their load, are supported and carried by the elliptic springs $g$, which in turn are supported and carried by the axle X or equivalent part of the frame or running-gear. The bolts $d$ pass freely through the supporting-plates $f$, and passing, as they do, through the body-brackets $b$ they become guides, holding the spiral springs $c$ and the elliptic springs $g$ firmly in their relative vertical position and at the same time allowing both springs to vibrate freely in the vertical direction. Thus the weight of the carriage-body $a$ is carried wholly by the spiral springs $c$, which in their turn are carried wholly by the elliptic springs $g$ through their top plates $f$, and the aggregate elasticity or resilience of both is utilized, while both are held in their appropriate relative position by the bolts $d$, supporting the carriage-body $a$ through the spiral springs $c$ and passing freely through the top plates $f$, acting as guides to maintain the relative vertical position of the spiral spring $c$ and the elliptic spring $g$.

Instead of offsetting the spiral springs $c$ slightly over on one side of the elliptic springs $g$ by the bearing-plates $f$, so that the supporting-bolts $d$ shall pass on one side, but close to the sides of the top members of the elliptic spring $g$. I may set the spiral springs $c'$, as shown in Figs. 3 and 4, on plates centrally over the elliptic springs $g$ and pass two bolts $i$ up through the top members of the elliptic springs $g$ and vertically on the two sides of the spiral springs $c'$ and through top supporting-plates $h$. These bolts $i$ pass down freely as guides through the top members of the elliptic springs $g'$ and through the body-brackets, with nuts below. The two bolts $i$ are used in this form instead of one bolt $d$, as in the first above described, to avoid weakening the elliptic spring $g$ by boring a hole through it large enough to accommodate a guide-bolt as large as the single one, $d$, would necessarily be to support the weight and other incident strains.

Another modification of the system of compounding spiral with elliptic springs for automobiles and other vehicles where comparatively much elasticity or resilience is desirable, as provided in the foregoing description, is illustrated in Figs. 5 and 6, in which the spiral spring is suspended within or between the bottom and top members of the elliptic spring. The carriage-body $a$ through the supporting-bracket $b$ is carried by the spiral springs $c^2$. These spiral springs $c^2$, with their load, are supported and carried by the elliptic springs $g^2$ through the bolt $t$, which passes freely as a guide through the body-bracket $b$ and thence through and is supported by a nut on top by the plate $u$, which in turn is bolted to and supported by the top member of the elliptic spring $g^2$. Thus the weight of the carriage-body is carried by the spiral springs and the spiral springs are carried by the elliptic springs, and hence the elasticity of both is realized in the carriage.

Still another form of compounding elliptic with spiral springs and realizing the elasticity of both is shown in Figs. 7 and 8, wherein the spiral spring $c^3$ is likewise suspended within or between the top and bottom members of the elliptic spring by the two bolts $v$ passing freely as guides through holes in the body-bracket $b$ and through the top of the elliptic spring $g^3$ and the plates $w$. Otherwise instead of passing through the top member of the spring $g^3$, as shown, these bolts $v$ may pass up on the two sides of the top member of the elliptic spring $g$ and through the top plate $w$. In either case the bracket $b$ of the carriage-body rests on the tops of the spiral spring $c^3$, which in turn is suspended by the bolts $v$ and plate $k^3$, through the plate $w$, from the top of the elliptic spring $g^3$, the bolts $v$ passing freely through the body-bracket $b$.

Figure 9:
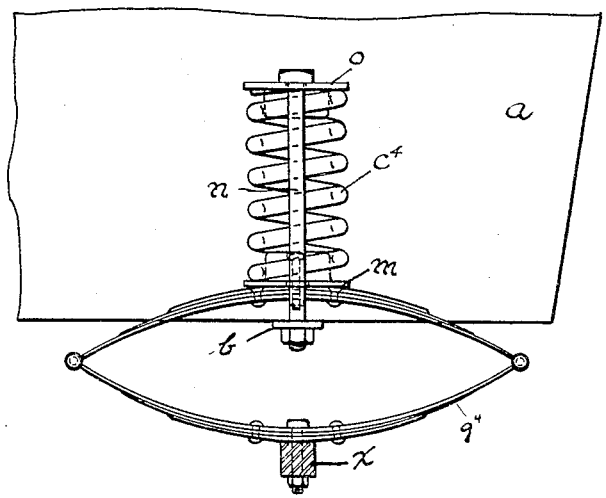
Figure 10:
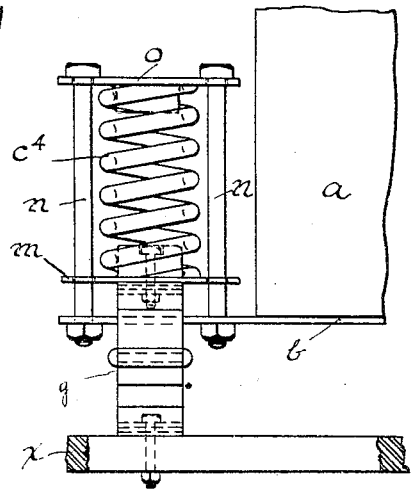

Figs. 9 and 10 represent a still different form of construction and arrangement of some of the various parts, applying, however, the same principle as before. Instead of the single bolt $d$ passing down within the coils of the spiral spring $c$, as in Figs. 1 and 2, and instead of the two bolts $i$ passing outside of the spiral spring $c'$ and through the elliptic spring $g'$, as in Figs. 3 and 4, I set the spiral spring $c^4$ in this form on plates $m$ centrally over the elliptic spring $g^4$ and pass supporting-bolts $n$ up alongside the top member of the elliptic spring $g^4$ and still up alongside of the spiral spring $c^4$ through the top supporting-plate $o$. These bolts $n$ pass down freely as guides through the plates $m$ and alongside of the top members of the elliptic spring $g^4$ and through the body-brackets $b$, with nuts below.

Figure 11:
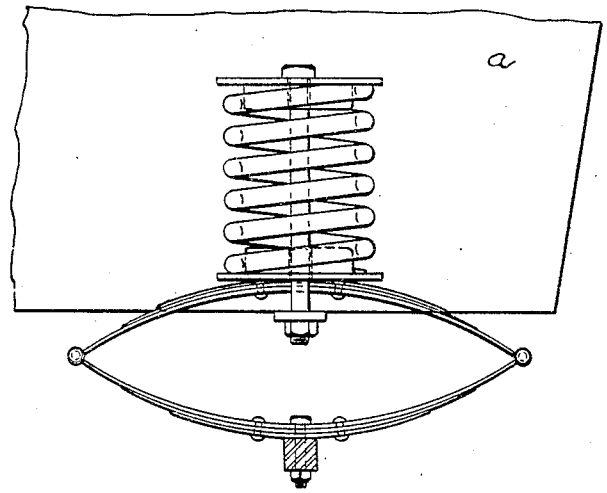
Figure 12:
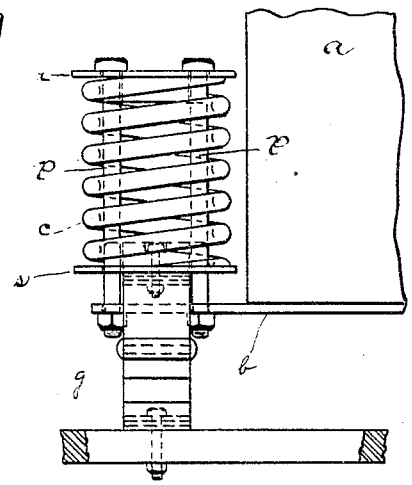

A further modification is shown in Figs. 11 and 12, wherein two supporting-bolts $p$ pass up on the two sides of the top member of the elliptic spring $g$ and up through within the coils of spiral spring $c$ and through the top plates $r$. These supporting-bolts $p$ pass down as guides freely through the top plates $s$ of the elliptic springs and through the body-brackets $b$, with nuts below.

What I claim is—

1. In a vehicle, the combination with the supporting-axle and vehicle-body, of an elliptical spring supported by the axle, a spiral spring supported by the central portion of the elliptical spring, and a connection between the body and spiral spring, substantially as described.

2. In a vehicle, the combination with the supporting-axle and vehicle-body, of an elliptical spring supported from the axle, a spiral spring supported by the elliptical spring, a member on the vehicle-body supported by the coiled spring, and guide-rods for preserving the alinement of said springs, substantially as described.

3. In a vehicle, the combination with the supporting-axle and vehicle-body, of an elliptical spring supported from the axle, a second spring supported by the central portion of the elliptical spring, a member on the vehicle-body supported by the said second spring, and guide-rods for preserving the alinement of said springs, substantially as described.

In testimony whereof I affix my signature in presence of two witnesses.

JOHN W. NESMITH.

Witnesses:
F. D. GROSS,
J. P. EVANS.